United States Patent
Loheide et al.

(10) Patent No.: US 10,645,462 B2
(45) Date of Patent: May 5, 2020

(54) DYNAMIC CHANNEL VERSIONING IN A BROADCAST AIR CHAIN

(71) Applicant: Turner Broadcasting System, Inc., Atlanta, GA (US)

(72) Inventors: Donald Jude Loheide, Mableton, GA (US); Nishith Kumar Sinha, Mableton, GA (US); Mark Cooper Pope, V, Atlanta, GA (US)

(73) Assignee: TURNER BROADCASTING SYSTEM, INC., Atlanta, GA (US)

( * ) Notice: Subject to any disclaimer, the term of this patent is extended or adjusted under 35 U.S.C. 154(b) by 0 days.

(21) Appl. No.: 15/396,614

(22) Filed: Dec. 31, 2016

(65) Prior Publication Data

US 2018/0192155 A1  Jul. 5, 2018

(51) Int. Cl.
| | |
|---|---|
| *H04N 21/6405* | (2011.01) |
| *H04N 21/234* | (2011.01) |
| *H04N 21/2385* | (2011.01) |
| *H04N 21/262* | (2011.01) |
| *H04N 21/258* | (2011.01) |
| *H04L 12/28* | (2006.01) |

(52) U.S. Cl.
CPC ......... *H04N 21/6405* (2013.01); *H04L 12/28* (2013.01); *H04N 21/234* (2013.01); *H04N 21/2385* (2013.01); *H04N 21/25866* (2013.01); *H04N 21/262* (2013.01)

(58) Field of Classification Search
CPC ............. H04N 21/6405; H04N 21/234; H04N 21/2385; H04N 21/25866; H04N 21/262
See application file for complete search history.

(56) References Cited

U.S. PATENT DOCUMENTS

| | | |
|---|---|---|
| 6,378,129 B1 | 4/2002 | Zetts |
| 6,625,811 B1 | 9/2003 | Kaneko |
| 6,701,355 B1 * | 3/2004 | Brandt ................... G06Q 30/02 709/219 |
| 6,727,914 B1 | 4/2004 | Gutta |
| 7,051,352 B1 | 5/2006 | Schaffer |

(Continued)

OTHER PUBLICATIONS

Advisory Action in U.S. Appl. No. 15/396,453 dated Apr. 20, 2018.

(Continued)

*Primary Examiner* — Alexander Q Huerta
(74) *Attorney, Agent, or Firm* — Chip Law Group

(57) ABSTRACT

A media content packaging and distribution system that controls creation and distribution of a channel to be viewed on user-computing devices associated with a plurality of regions, receives a media feed of the channel from a distribution source device. Targeted content for a plurality of segments of the received media feed for each of the plurality of regions may be determined based on defined endpoint data that includes information related to the plurality of regions. A plurality of customized media feeds are generated based on at least the determined targeted content. The generated plurality of customized media feeds represents a plurality of versions of the channel. The plurality of customized media feeds are distributed via one or more communication mediums or a distribution system to be viewed on the user-computing devices.

25 Claims, 5 Drawing Sheets

(56) References Cited

U.S. PATENT DOCUMENTS

| | | | |
|---|---|---|---|
| 7,146,627 B1* | 12/2006 | Ismail | H04H 60/06 725/47 |
| 7,337,458 B2 | 2/2008 | Michelitsch et al. | |
| 7,380,262 B2 | 5/2008 | Wang et al. | |
| 7,581,237 B1 | 8/2009 | Kurapati | |
| 7,840,980 B2 | 11/2010 | Gutta | |
| 7,985,134 B2 | 7/2011 | Ellis | |
| 8,005,826 B1 | 8/2011 | Sahami et al. | |
| 8,533,761 B1 | 9/2013 | Sahami et al. | |
| 8,572,649 B1 | 10/2013 | Gossweiler et al. | |
| 8,578,042 B2 | 11/2013 | Hu et al. | |
| 8,631,440 B2 | 1/2014 | Gossweiler et al. | |
| 8,826,443 B1 | 9/2014 | Raman et al. | |
| 8,842,879 B2 | 9/2014 | Laksono et al. | |
| 8,843,965 B1 | 9/2014 | Kurapati et al. | |
| 9,094,639 B2 | 7/2015 | Yim et al. | |
| 9,130,918 B2 | 9/2015 | Picconi et al. | |
| 9,390,447 B1 | 7/2016 | Smith | |
| 10,075,753 B2 | 9/2018 | Loheide et al. | |
| 2002/0038457 A1 | 3/2002 | Numata et al. | |
| 2003/0023757 A1 | 1/2003 | Ishioka et al. | |
| 2003/0026628 A1 | 2/2003 | Krimoto | |
| 2003/0051239 A1* | 3/2003 | Hudspeth | H04N 7/165 725/34 |
| 2003/0126600 A1 | 7/2003 | Heuvelman | |
| 2003/0182658 A1 | 9/2003 | Alexander | |
| 2003/0212708 A1 | 11/2003 | Potrebic et al. | |
| 2004/0022278 A1 | 2/2004 | Thomas et al. | |
| 2004/0128682 A1* | 7/2004 | Liga | H04N 5/445 725/35 |
| 2005/0120369 A1 | 6/2005 | Matz | |
| 2005/0135613 A1 | 6/2005 | Brandenburg et al. | |
| 2006/0031889 A1 | 2/2006 | Bennett et al. | |
| 2006/0287915 A1* | 12/2006 | Boulet | G06Q 30/02 705/14.61 |
| 2007/0089141 A1* | 4/2007 | Gordon | H04N 5/44543 725/61 |
| 2007/0204292 A1* | 8/2007 | Riedl | H04N 7/17318 725/34 |
| 2007/0238035 A1 | 10/2007 | Holscher et al. | |
| 2007/0249367 A1* | 10/2007 | Sato | G06F 16/9537 455/456.3 |
| 2007/0250901 A1 | 10/2007 | McIntire et al. | |
| 2008/0052741 A1* | 2/2008 | Dharmaji | G06F 15/02 725/32 |
| 2008/0086742 A1* | 4/2008 | Aldrey | H04H 60/33 725/24 |
| 2008/0201735 A1 | 8/2008 | Sumiyoshi et al. | |
| 2008/0271078 A1 | 10/2008 | Gossweiler et al. | |
| 2008/0271080 A1 | 10/2008 | Gossweiler et al. | |
| 2008/0320513 A1 | 12/2008 | Wong et al. | |
| 2009/0070819 A1 | 3/2009 | Gajda et al. | |
| 2009/0254934 A1* | 10/2009 | Grammens | H04H 60/33 725/14 |
| 2010/0125880 A1 | 5/2010 | Roewe | |
| 2010/0146548 A1 | 6/2010 | Yim et al. | |
| 2010/0146559 A1* | 6/2010 | Lee | H04L 12/1822 725/61 |
| 2010/0169914 A1* | 7/2010 | Williamson | H04N 7/165 725/28 |
| 2010/0325655 A1 | 12/2010 | Perez | |
| 2010/0325657 A1 | 12/2010 | Sellers et al. | |
| 2011/0052144 A1 | 3/2011 | Abbas et al. | |
| 2011/0123062 A1 | 5/2011 | Hilu | |
| 2011/0164115 A1 | 7/2011 | Bennett et al. | |
| 2011/0238754 A1 | 9/2011 | Dasilva et al. | |
| 2012/0017282 A1 | 1/2012 | Kang et al. | |
| 2012/0066066 A1* | 3/2012 | Jain | G06Q 30/0261 705/14.58 |
| 2012/0110621 A1 | 5/2012 | Gossweiler | |
| 2012/0143693 A1* | 6/2012 | Chung | G06Q 30/0269 705/14.66 |
| 2012/0192232 A1 | 7/2012 | Ellis | |
| 2012/0272264 A1 | 10/2012 | Suzuki et al. | |
| 2012/0284737 A1* | 11/2012 | Savoor | H04N 21/25841 725/14 |
| 2012/0284746 A1* | 11/2012 | Evans | H04N 21/44204 725/34 |
| 2013/0160051 A1 | 6/2013 | Armstrong et al. | |
| 2013/0198328 A1 | 8/2013 | Green et al. | |
| 2013/0208213 A1 | 8/2013 | Liu et al. | |
| 2013/0263168 A1 | 10/2013 | Choi | |
| 2013/0305287 A1 | 11/2013 | Wong et al. | |
| 2013/0325605 A1* | 12/2013 | Callaghan | G06Q 30/02 705/14.53 |
| 2013/0339991 A1* | 12/2013 | Ricci | H04N 21/44204 725/14 |
| 2014/0032259 A1* | 1/2014 | LaFever | G06Q 30/0201 705/7.29 |
| 2014/0071818 A1 | 3/2014 | Wang et al. | |
| 2014/0143806 A1 | 5/2014 | Steinberg et al. | |
| 2014/0157312 A1 | 6/2014 | Williams et al. | |
| 2014/0173666 A1 | 6/2014 | Gordon et al. | |
| 2014/0189743 A1 | 7/2014 | Kennedy et al. | |
| 2014/0189754 A1* | 7/2014 | Major | H04L 65/4076 725/67 |
| 2014/0310745 A1 | 10/2014 | Canney et al. | |
| 2014/0351843 A1 | 11/2014 | Theriault | |
| 2014/0359656 A1 | 12/2014 | Banica et al. | |
| 2014/0366068 A1 | 12/2014 | Burkitt et al. | |
| 2015/0012926 A1 | 1/2015 | Wei et al. | |
| 2015/0106856 A1 | 4/2015 | Rankine | |
| 2015/0127845 A1 | 5/2015 | Phillips et al. | |
| 2015/0237386 A1* | 8/2015 | Sheehan | H04N 21/2668 725/34 |
| 2015/0237389 A1 | 8/2015 | Grouf et al. | |
| 2015/0249865 A1 | 9/2015 | Oliveira | |
| 2015/0382274 A1* | 12/2015 | Logvinov | H04L 41/0833 370/311 |
| 2016/0029055 A1 | 1/2016 | Nunez et al. | |
| 2016/0073176 A1* | 3/2016 | Phillips | H04N 21/2402 725/35 |
| 2016/0112740 A1 | 4/2016 | Francisco et al. | |
| 2016/0182954 A1 | 6/2016 | Nguyen et al. | |
| 2016/0227260 A1* | 8/2016 | Hundemer | H04N 21/23424 |
| 2017/0034591 A1* | 2/2017 | Ray | H04L 65/4084 |
| 2017/0064400 A1 | 3/2017 | Riegel et al. | |
| 2017/0070789 A1 | 3/2017 | Liassides et al. | |
| 2017/0201779 A1 | 7/2017 | Publicover et al. | |
| 2017/0238035 A1 | 8/2017 | Perez | |

OTHER PUBLICATIONS

Advisory Action in U.S. Appl. No. 15/396,475 dated Sep. 20, 2018.
Corrected Notice of Allowance in U.S. Appl. No. 15/396,462 dated Aug. 8, 2018.
Corrected Notice of Allowance in U.S. Appl. No. 15/396,462 dated Jul. 11, 2018.
Final Office Action in U.S. Appl. No. 15/396,475 dated Jul. 12, 2018.
Non-Final Office Action in U.S. Appl. No. 15/396,453 dated Jun. 14, 2018.
Non-Final Office Action in U.S. Appl. No. 15/396,468 dated Jul. 3, 2018.
Non-Final Office Action in U.S. Appl. No. 15/396,624 dated Jul. 13, 2018.
Notice of Allowance in U.S. Appl. No. 15/396,462 dated Jun. 1, 2018.
Notice of Allowance in U.S. Appl. No. 15/396,462 dated May 15, 2018.
Office Action in U.S. Appl. No. 15/396,468 dated Jan. 26, 2018.
Office Action in U.S. Appl. No. 15/396,453 dated Feb. 27, 2018.
Office Action in U.S. Appl. No. 15/396,475 dated Mar. 29, 2018.
Final Office Action in U.S. Appl. No. 15/396,624 dated Jan. 24, 2019.
Advisory Action in U.S. Appl. No. 15/396,468 dated Jan. 7, 2019.
Final Office Action in U.S. Appl. No. 15/396,468 dated Nov. 15, 2018.
Non-Final Office Action in U.S. Appl. No. 15/396,475 dated Nov. 30, 2018.

(56) References Cited

OTHER PUBLICATIONS

Non-Final Office Action in U.S. Appl. No. 15/986,218 dated Nov. 28, 2018.
Notice of Allowance in U.S. Appl. No. 15/396,453 dated Jan. 10, 2019.
Final Office Action for U.S. Appl. No. 15/986,218 dated Apr. 24, 2019.
Final Office Action for U.S. Appl. No. 15/988,308 dated May 9, 2019.
Final Office Action in U.S. Appl. No. 15/396,475 dated Feb. 25, 2019.
Non-Final Office Action in U.S. Appl. No. 15/396,468 dated Mar. 1, 2019.
Corrected Notice of Allowance for U.S. Appl. No. 15/396,624 dated Sep. 5, 2019.
Non-Final Office Action for U.S. Appl. No. 15/986,218 dated Sep. 27, 2019.
Non-Final Office Action for U.S. Appl. No. 15/396,624 dated Oct. 16, 2019.
Advisory Action for U.S. Appl. No. 15/396,475 dated Jun. 3, 2019.
Advisory Action for U.S. Appl. No. 15/988,308 dated Jul. 16, 2019.
Advisory Action for U.S. Appl. No. 15/986,218 dated Jul. 12, 2019.
Corrected Notice of Allowance for U.S. Appl. No. 15/396,453 dated Jun. 3, 2019.
Corrected Notice of Allowance for U.S. Appl. No. 15/396,453 dated Aug. 21, 2019.
Corrected Notice of Allowance in U.S. Appl. No. 15/396,453 dated Jun. 13, 2019.
Non-Final Office Action for U.S. Appl. No. 15/986,361 dated Jul. 11, 2019.
Non-Final Office Action for U.S. Appl. No. 15/986,451 dated Jun. 27, 2019.
Non-final Office Action for U.S. Appl. No. 15/988,241 dated Jun. 27, 2019.
Non-Final Office Action for U.S. Appl. No. 15/396,475 dated Aug. 8, 2019.
Non-Final Office Action for U.S. Appl. No. 16/128,104 dated Aug. 21, 2019.
Notice of Allowance for U.S. Appl. No. 15/396,624 dated May 31, 2019.
Supplemental Notice of Allowance for U.S. Appl. No. 15/396,624 dated Aug. 14, 2019.
Non-Final Office Action for U.S. Appl. No. 16/592,394 dated Mar. 2, 2020.
Notice of Allowance for U.S. Appl. No. 15/396,624 dated Feb. 12, 2020.

* cited by examiner

DYNAMIC CHANNEL VERSIONING IN A BROADCAST AIR CHAIN

CROSS-REFERENCE TO RELATED APPLICATIONS/INCORPORATION BY REFERENCE

This application makes reference to:
U.S. application Ser. No. 15/396,624, which is filed concurrently herewith.

Each of the above referenced patent applications is hereby incorporated herein by reference in its entirety.

FIELD OF TECHNOLOGY

Certain embodiments of the disclosure relate to a media content packaging and distribution system. More specifically, certain embodiments of the disclosure relate to a method and system for dynamic channel versioning in a broadcast air chain.

BACKGROUND

Advancements in the television and broadcasting sector have led to the development of various technologies and broadcasting platforms that are changing the way consumers' access and view media content. Broadcasting platforms usually refer to the types of networks that are used to deliver a broadcast feed to the viewer. A network provider (network operator) usually decides what shows (programming content) to air in the upcoming broadcast year and when to air them. A programming schedule defines an aggregate capacity of non-programming airtime, which may be filled with various non-programming content, such as commercials, promos, and/or the like. Thereafter, based on the programming schedule, the programming content and the non-programming content may be broadcasted, to be viewed on various computing devices (e.g., televisions) by the viewers.

Traditionally, the network provider broadcasts the same programming and non-programming content through a subscribed channel to the viewers within different regions. However, in certain scenarios, the received non-programming content may not be relevant to the preferences, likes, or dislikes of viewers due to their respective regions. In such scenarios, it may be difficult for the network provider to broadcast the content through different channels for viewer residing in different regions. Such problem may be tackled but requires installation of substantial infrastructure and resources that may increase overall operating and maintaining cost of the network provider.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

Systems and/or methods are provided for dynamic channel versioning in a broadcast air chain, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Figure 1A:
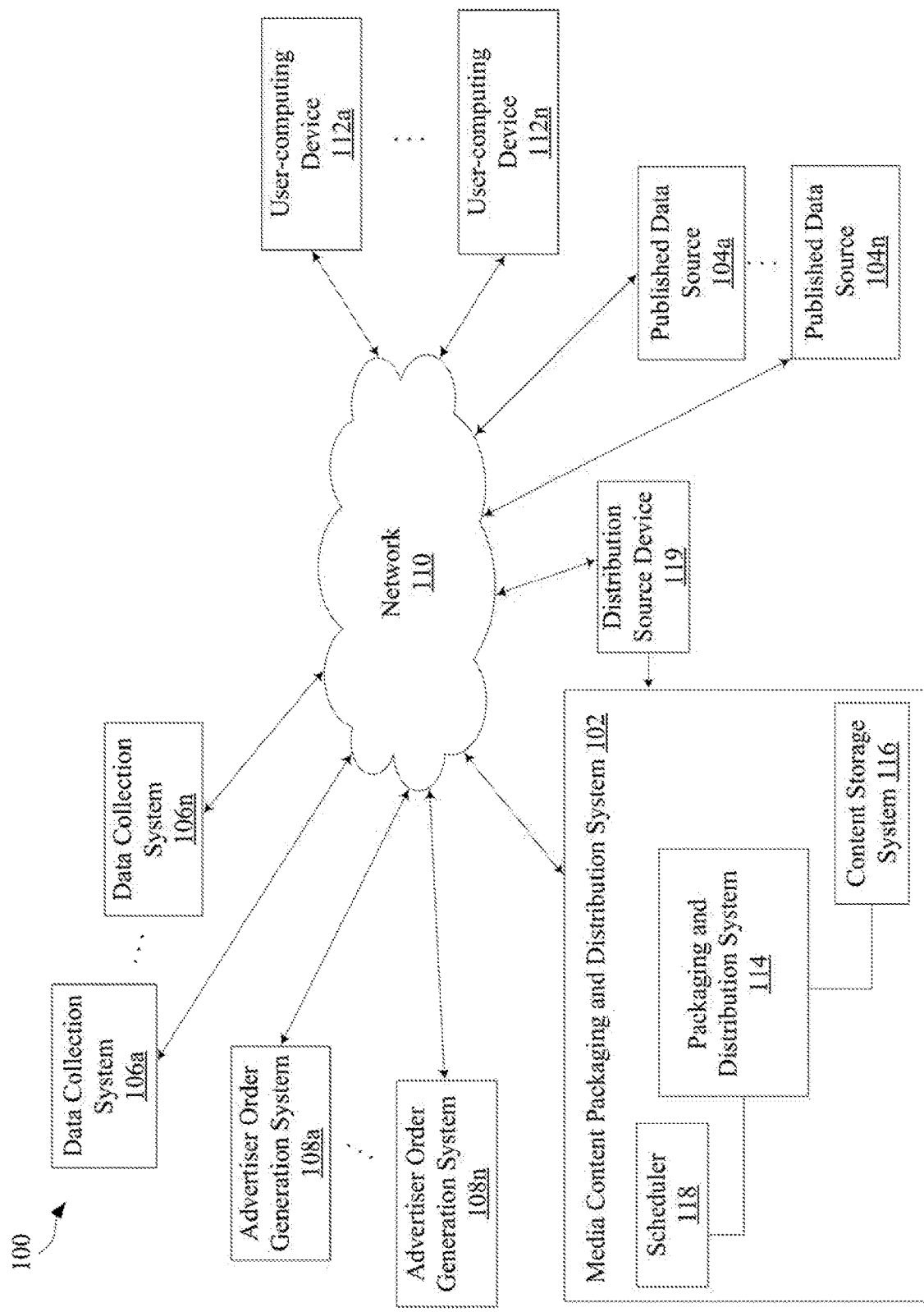
FIG. 1A is a block diagram that illustrates an exemplary system for dynamic channel versioning in a broadcast air chain, in accordance with an exemplary embodiment of the disclosure.

Certain embodiments of the disclosure may be found in a method and system for dynamic channel versioning in a broadcast air chain. Various embodiments of the disclosure provide a method and system that controls distribution of a channel to be viewed on a plurality of user-computing devices associated with one or more of a plurality of regions. Various embodiments of the disclosure generate a plurality of customized media feeds for a media feed to be viewed on the one or more of the plurality of user-computing devices. The generation of the plurality of customized media feeds makes optimal use of available endpoint data that includes at least information related to the plurality of regions of a plurality of users to provide different versions of the channel to the plurality of users.

In accordance with various embodiments of the disclosure, a media content packaging and distribution system that controls creation and distribution of a channel comprising media to be viewed on one or more of a plurality of user-computing devices associated with one or more of a plurality of regions is configured to receive a media feed of the channel from a distribution source device over a distribution system. The distribution system may comprise one or more networks. The distribution may occur, by for example, broadcast, multicast, and/or streaming protocols such as HHLS, DASK, smooth streaming. The media content packaging and distribution system. The at least one of the plurality of regions may comprise a geographic region, a marketing region or zone, a demographics region, and/or a logical boundary. The media content packaging and distribution system may determine targeted content for a plurality of segments of the received media feed for each of the plurality of regions, based on defined endpoint data that includes information related to the plurality of regions. The media may comprise video and/or audio. A plurality of customized media feeds are generated based on at least the determined targeted content, wherein the generated plurality of customized media feeds represents a plurality of versions of the channel. The plurality of customized media feeds are distributed to be viewed on the one or more of the plurality of user-computing devices via one or more communication mediums. A customized media feed of the plurality of customized media feeds to be viewed on a set of user-computing devices of the one or more of the plurality of user-computing devices corresponds to a given region of the one or more of the plurality of regions. The media feed corresponds to a live media feed or a stored media feed. The endpoint data further includes demographic data, media-viewing pattern data, and/or station identifiers. The plurality of segments of the received media feed may be determined based on one or more inband (in-band) or out of (out-of-band) band triggers detected in the received media feed. The generation of the plurality of customized media feeds for the one or more of the plurality of regions may be based on media stitching of the plurality of segments of the received media feed that corresponds to programming data and the determined targeted content for the one or more of the plurality of regions. The media stitching of the plurality of segments of the received media feed and the determined targeted content for the one or more of the plurality of regions may be based on one or more modifications of a programming schedule of the channel. The distribution of the customized media feed of the plurality of customized media feeds to be viewed on the one or more of the plurality of user-computing devices of a region of the plurality of regions is executed such that the customized media feed is different from remaining customized media feeds of the plurality of customized media feeds that are to be viewed on at least one remaining user-computing devices of the plurality of user-computing devices located at remaining regions of the plurality of regions. The distribution of the plurality of customized media feeds to be viewed on the plurality of user-computing devices at the plurality of regions is controlled based on streaming criteria of the plurality of customized media feeds on the plurality of user-computing devices at the plurality of regions, wherein the controlled distribution minimizes power and bandwidth of the one or more communication mediums that are required for the distribution. The targeted content to be inserted in one or more spots in the plurality of segments of the received media feed is further determined based on a real-time, near real-time, or historical events-driven feedback received based on aggregated endpoint data.

FIG. 1A is a block diagram that illustrates an exemplary system for dynamic channel versioning in a broadcast air chain, in accordance with an exemplary embodiment of the disclosure. Referring to FIG. 1A, there is shown a system 100 that comprises a media content packaging and distribution system 102 that is communicatively coupled to published data sources 104a, . . . , 104n, data collection systems 106a, . . . , 106n, and advertiser order generation systems 108a, . . . , 108n, via a network 110. There is shown a plurality of user-computing devices 112a, . . . , 112n that are communicatively coupled to the network 110. The media content packaging and distribution system 102 may comprise a packaging and distribution system 114, a content storage system 116, and a scheduler 118. There is also shown a distribution source device 119 communicatively coupled to the media content packaging and distribution system 102 and the network 110.

The media content packaging and distribution system 102 may comprise suitable logic, circuitry, and interfaces that may be configured to execute code that handles distribution of content comprising audio, video, and/or data. The media content packaging and distribution system 102 may be operated by a broadcasting company, which may be referred to as a broadcast provider (or broadcast operator), or a network provider (or network operator). The broadcast provider may handle a single channel, a plurality of channels, or one or more networks. The broadcast provider may be operable to distribute content via one or more channels, for example, traditional over-the-air broadcast channels, cable television networks, satellite communication networks, the Internet, and/or other content delivery networks (CDNs).

Each of the published data sources 104a, . . . , 104n may be communicatively coupled to one or more television networks and may comprise suitable logic, circuitry, and interfaces that may be configured to execute code that provides actual audiences for programs that were aired. As illustrated in FIG. 1A, the published data sources 104a, . . . , 104n are communicatively coupled to the media content packaging and distribution system 102, via the network 110. An exemplary published data source may be Nielsen. Another exemplary published data source may be a published database that provides ratings for a media item, such as gross rating point (GRP) or other metric. The GRP is an advertising impact measure or a promotion impact measure for each advertising and/or promotional campaigns, known in the art.

Each of the data collection systems 106a, . . . , 106n may comprise suitable logic, circuitry, and interfaces that may be configured to execute code to collect data from a plurality of data sources, such as one or more social networking platforms and one or more sensing devices (for example, temperature sensors, barometer, and/or the like), via one or more communication mediums, such as the network 110. The plurality of data sources may be associated with a plurality of regions. The at least one of the plurality of regions may comprise a geographic region, a marketing region or zone, a demographics region, and/or a logical boundary. The collected data may include at least information related to the plurality of regions, for example, weather information. The collected data may further include at least one of demographic data, media-viewing pattern data, or station IDs. The media content packaging and distribution system 102 may be configured to electronically receive, via the network 110, the collected data that corresponds to the plurality of regions from the data collection systems 106a, . . . , 106n.

Each of the advertiser order generation systems 108a, . . . , 108n may comprise suitable logic, circuitry, and interfaces that may be configured to place orders with the broadcasting company that include information about type of advertisements to broadcast, the number of advertisements to broadcast, and when should the advertisements be aired. The placed order may correspond to the advertisements that are associated with the plurality of regions. The media content packaging and distribution system 102 may be configured to electronically receive, via the network 110, deals comprising advertisers' orders from the advertiser order generation systems 108a, . . . , 108n. The advertiser order generation systems 108a, . . . , 108n may be associated with the plurality of regions.

The network 110 may be any kind of network, or a combination of various networks, and it is shown illustrating the communication that may occur between the media content packaging and distribution system 102 and the published data sources 104a, . . . , 104n, the data collection systems 106a, . . . , 106n, and/or the advertiser order generation systems 108a, . . . , 108n. For example, the network 110 may comprise one or more of a cable television network, the Internet, a satellite communication network, a wide area network (WAN), a medium area network (MAN), a local area network (LAN), an analogue terrestrial network, a digital terrestrial network, a direct-to-home satellite network, cable, an Internet Protocol (IP), and an over-the-top television (OTT) network.

Each of the plurality of user-computing devices 112a, . . . , 112n may refer to an end-user device where the content (for example, the programming content and/or the non-programming content) may be streamed to be viewed by a viewer. Examples of the plurality of user-computing devices 112a, . . . , 112n may include, but are not limited to, connected TVs, connected TV with paired devices (e.g., tablets), and second screen devices, such as smartphones and tablets.

The packaging and distribution system 114 may comprise suitable logic, circuitry, and interfaces that may be configured to execute code to control packaging of the programming content with the non-programming content, and thereafter, distribution (broadcast, simulcast, multicasting, stream on a channel) of the packaged content to the user-computing devices 112a, . . . , 112n, via the network 110. The packaging and distribution system 114 may receive a media feed (e.g. audio feed or video feed) that corresponds to the programming content from the distribution source device 119 associated with the broadcast provider. Further, the packaging and distribution system 114 may determine a plurality of segments of the received media feed based on one or more inbound triggers associated with the received media feed. The packaging and distribution system 114 may further determine targeted content based on at least the collected data that corresponds to the plurality of regions. Further, based on a schedule generated by the scheduler 118, the packaging and distribution system 114 may execute media stitching of the plurality of segments and the determined targeted content to generate a plurality of customized media feeds (e.g. audio feeds and/or video feeds) of the received media feed. For example, the media stitching may include a replacement of a segment of the plurality of segments with the determined targeted content. In another example, the media stitching may include an insertion or addition of the determined targeted content among the plurality of segments. In yet another example, the media stitching may further include a re-ordering of the plurality of segments along with the insertion of the determined targeted content (or replacement of a segment with the determined targeted content). Each of the plurality of customized media feeds may correspond to each of the plurality of regions. The packaging and distribution system 114 may further broadcast the generated plurality of customized media feeds to be viewed on the plurality of user-computing devices 112a, . . . , 112n, via one or more communication mediums, such as the network 110.

The content storage system 116 may comprise suitable logic, circuitry, and interfaces that may be configured to execute code to temporarily store live recording data of an event in a storage buffer system. The content storage system 116 may be further configured to store the received media feed from one or more broadcast source devices. The content storage system 116 may be further configured to maintain a repository of various programming data, such as movies, music videos, documentary videos, and/or the like, in the storage buffer system. Metadata associated with the various programming content and/or non-programming content may be further stored in the content storage system 116. The metadata may include rules or rules related to the programming content and/or non-programming content. For example, the metadata may specify whether or not the programming content and/or non-programming content may be archived, and if so, when and where it may be archived. The metadata may also specify whether or not the programming content and/or non-programming content may be blocked (blocked-out), and if so where and what portions may be blocked.

The scheduler 118 may comprise suitable logic, circuitry, and interfaces that may be configured to execute a code that handles a programming schedule of the channel. The programming schedule of a channel defines what media content should be scheduled, the ordering of the media content during playout, and when to distribute media. The content that is distributed may include both the programming content, such as TV programs, and the non-programming content, such as advertisements or promotional media. In accordance with an embodiment, the programming schedule may be a text file or an XML file, that comprise a reference mapping of different media content items that needs to be stitched by a stream manipulator (SM) 122 (described, for example, in FIG. 1B). The programming schedule may further be configured to indicate a start and an end of one or more portions of the programming content and/or the non-programming content during distribution of the programming content and the non-programming content on the channel to be viewed on the plurality of user-computing devices 112a, . . . , 112n. The programming schedule of the channel may be determined for a time period defined by the broadcast or network provider (network operator). The scheduler 118 may receive a programming schedule of an existing channel from the distribution source device 119. The scheduler 118 may modify the received programming schedule to include the determined targeted content.

The distribution source device 119 may comprise suitable logic, circuitry, and interfaces that may be configured to communicate a media feed and a programming schedule of a channel, such as an existing channel, to the media content packaging and distribution system 102. In accordance with an embodiment, the media feed of the channel may correspond to a broadcast feed. The source device 119 may be communicatively coupled to the network 110.

In operation, the media content packaging and distribution system 102 may be configured to control distribution of a channel to be viewed on the plurality of user-computing devices 112a, . . . , 112n. The plurality of user-computing devices 112a, . . . , 112n may be associated with a plurality of regions. For example, each of the plurality of user-computing devices 112a, . . . , 112n may be associated with a corresponding region of the plurality of regions. In another example, more than one user-computing devices may be associated with a region of the plurality of regions. The media content packaging and distribution system 102 may receive a media feed of the channel from the distribution source device 119 over a communication network, such as the network 110. Further, the packaging and distribution system 114 may determine a plurality of segments of the media feed based on one or more inbound triggers detected in the received media feed. The media content packaging and distribution system 102 may further receive defined endpoint data from the data collection systems 106a, . . . , 106n. The defined endpoint data, collected by the data collection systems 106a, . . . , 106n, may include at least information related to the plurality of regions. The defined endpoint data may be collected based on instructions defined by a broadcast or network provider (network operator). The defined endpoint data may further include at least one of demographic data, media-viewing pattern data, and station IDs. Based on the collected endpoint data, the packaging and distribution system 114 may determine targeted content for the plurality of segments of the received media feed for each of the plurality of regions. Thereafter, the packaging and distribution system 114 may be configured to generate a plurality of customized media feeds of the received media feed. The packaging and distribution system 114 may generate the plurality of customized media feeds based on media stitching of the plurality of segments of the received media feed and the determined targeted content for the plurality of regions. The generated plurality of customized media feeds may represent a plurality of versions of the channel. The packaging and distribution system 114 may further distribute the generated plurality of customized media feeds on the channel to be viewed on the plurality of user-computing devices 112a, . . . , 112n. A customized media feed of the plurality of customized media feeds to be viewed on a set of user-computing devices, such as 112a, . . . , 112c, of the plurality of user-computing devices 112a, . . . , 112n corresponds to a region, such as "G1", of the plurality of regions. The distribution of the generated customized media feed to be viewed on the plurality of user-computing devices 112a, . . . , 112n of the region may be controlled such that the generated customized media feed is different from remaining customized media feeds of the plurality of customized media feeds. The remaining customized media feeds of the plurality of customized media feeds may be viewed on remaining user-computing devices, such as 112d, . . . , 112n, of the plurality of user-computing devices 112a, . . . , 112n located at remaining regions, such as "G2", "G3", and "G4", of the plurality of regions.

Figure 1B:
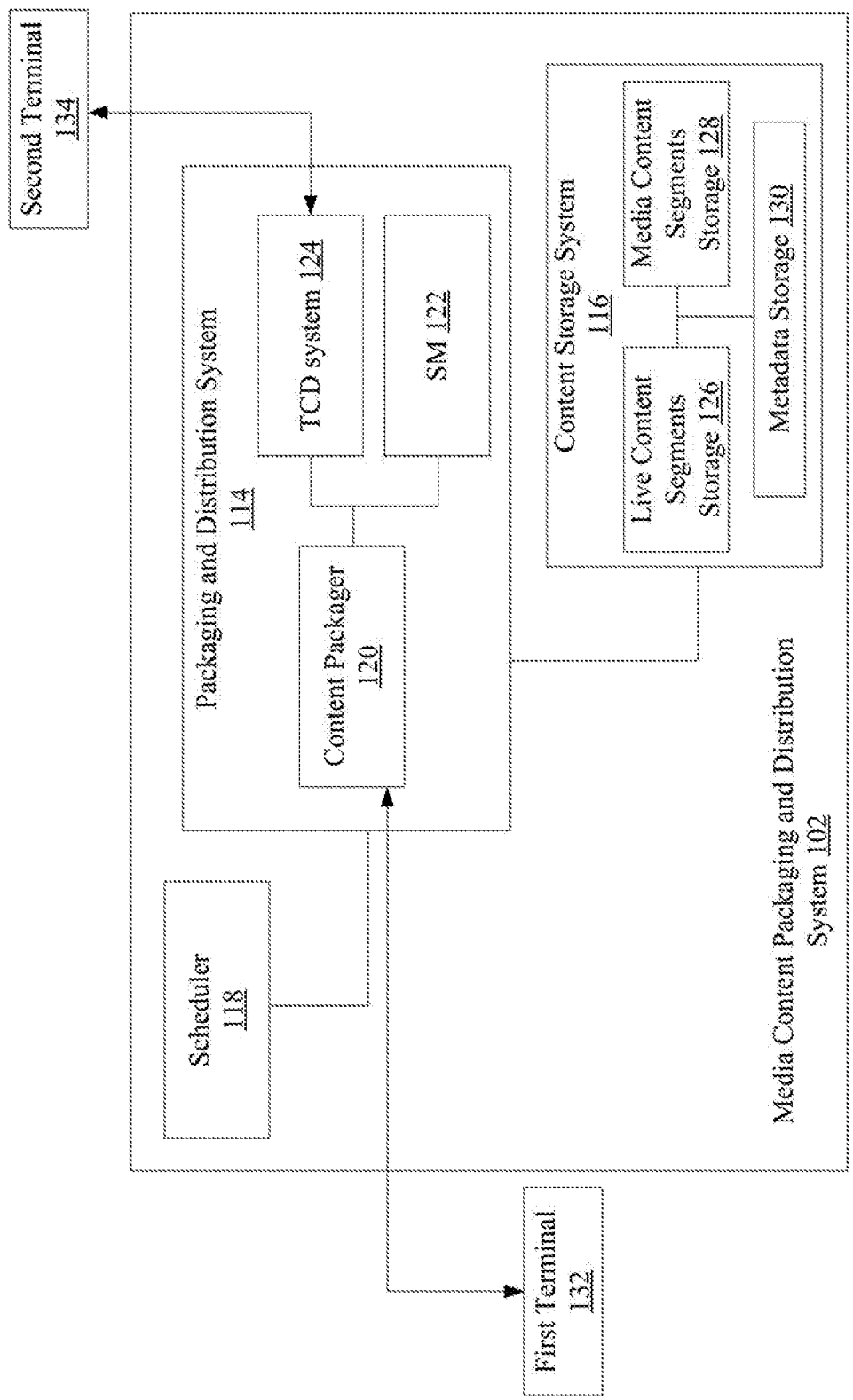
FIG. 1B is a block diagram that illustrates an exemplary media content packaging and distribution system for dynamic channel versioning in a broadcast air chain, in accordance with an exemplary embodiment of the disclosure.

FIG. 1B is a block diagram that illustrates an exemplary media content packaging and distribution system for dynamic channel versioning in a broadcast air chain, in accordance with an exemplary embodiment of the disclosure. Referring to FIG. 1B, the media content packaging and distribution system 102 may further comprise a content packager 120, the SM 122, a targeted content determination (TCD) system 124, a live content segments storage content segments storage 126, a media content (e.g. audio on demand and/or video on demand (VOD)) content segments storage 128, a metadata storage 130, and one or more terminals, such as a first terminal 132 associated with a user, such as a broadcast or network provider (or operator), and a second terminal 134 associated with a user, such as a sales user. The sales user may utilize the second terminal 134 to define endpoint data. There is also shown the packaging and distribution system 114, the content storage system 116, and the scheduler 118, as described in FIG. 1A.

In some embodiments of the disclosure, the packaging and distribution system 114, the content storage system 116, and the scheduler 118 may be integrated to form an integrated system. In some embodiments of the disclosure, as shown, the packaging and distribution system 114 may be distinct from the content storage system 116 and the scheduler 118. In some embodiments of the disclosure, the content packager 120, the SM 122, and the TCD system 124 may be integrated as part of the packaging and distribution system 114 to form an integrated system, as shown. In some embodiments of the disclosure, each of the content packager 120, the SM 122, and the TCD system 124 may be located separately from the packaging and distribution system 114. Similarly, in some embodiments of the disclosure, the live content segments storage 126, the media content segments storage 128, the metadata storage 130 may be integrated as part of the content storage system 116 to form an integrated system, as shown. In some embodiments of the disclosure, each of the live content segments storage 126, the MEDIA content segments storage 128, and the metadata storage 130 may be located separately from the content storage system 116.

The content packager 120 may comprise suitable logic, circuitry, and interfaces that may be configured to execute code to receive programming and/or non-programming content from one or more sources in one or more input formats and convert the received programming and/or non-programming content from the one or more input formats to one or more corresponding output formats. In this regard, for example, the content packager 120 may be operable to receive one or more MPEG2 transport stream (TS) and convert the corresponding content to one or more output formats (for example, various hypertext transfer protocol (HTTP) formats, such as HLS, protected HLS, Smooth Streams, and dynamic adaptive streaming over HTTP (Dash)) based on, for example, a target user-computing device. The content packager 120 may be configured to execute code that handles packaging of the programming content and/or the non-programming content. The content packager 120 interfaces with various hardware components in the media content packaging and distribution system 102, for example, the SM 122, the TCD system 124, the live content segments storage 126, the MEDIA content segments storage 128, the metadata storage 130, the scheduler 118, and/or the first terminal 132. The content packager 120 may be configured to receive a media feed from the distribution source device 119, via, for example, the first terminal 132. In another example, the content packager 120 may receive (or retrieve) the media feed from the content storage system 116, such as the live content segments storage 126 or the MEDIA content segments storage 128. The content packager 120 may be configured to retrieve metadata, for example, one or more inbound triggers of the programming content, such as the received media feed, from the metadata storage 130. Based on at least the one or more inbound triggers of the received media feed, the content packager 120 may determine a plurality of segments of the received media feed. In accordance with an embodiment, the content packager 120 may be further configured to determine one or more spots in the determined plurality of segments. The one or more spots may be utilized for inserting the non-programming content or other desired content based on a plurality of regions.

The SM 122 may comprise suitable logic, circuitry, and interfaces that may be configured to execute code to stitch one or more media items (such as the plurality of segments and the determined targeted content) in accordance with the programming schedule, to generate a customized version of the content for specific use cases. For example, the SM 122 may execute media stitching of the determined plurality of segments of the received media feed and the targeted content determined for a region of the plurality of regions. Based on the media stitching of the determined plurality of segments and the determined targeted content for the region, the SM 122 may generate a customized media feed of the channel to be viewed on a set of user-computing devices of the plurality of user-computing devices 112a, . . . , 112n associated with the region. In accordance with an embodiment, the SM 122 may be configured to execute media stitching based on one or more modifications of a programming schedule of the channel which may be done in real time or near-real time. The one or more modifications of the programming schedule may be driven based on the determination of targeted content. The SM 122 may comprise a system for converting pre-encoded media content for live distribution.

The TCD system 124 may comprise suitable logic, circuitry, and interfaces that may be configured to generate the targeted content. For example, the TCD system 124 may execute code that handles generation of the targeted content for each of the plurality of regions. The TCD system 124 may be configured to acquire or receive data, for example, defined endpoint data collected by the data collection systems 106a, . . . , 106n. The defined endpoint data may include information that indicate, for example, weather or traffic conditions, related to the plurality of regions. Based on the defined endpoint data that corresponds to each of the plurality of regions, the TCD system 124 may determine the targeted content for the respective plurality of regions. The determined targeted content may correspond to multimedia content, such as at least one of a video, audio, animation, or text content.

The live content segments storage 126 may comprise suitable logic, circuitry, and interfaces that may be configured to store live content segments of one or more real-time content streams of channels, for example, a live media feed of a CNN channel. Such live media feed may be distributed in real-time on the channel to be viewed on the plurality of user-computing devices 112a, . . . , 112n. The live content storage system 126 may be communicatively coupled to the network 110 to receive the one or more live media feeds of channels.

The media content segments storage 128 may comprise suitable logic, circuitry, and interfaces that may be configured to store one or more pre-encoded media content segments of non-real time programming data, for example, movies, music videos, clips of various shows or programs, and/or the like. Such one or more pre-encoded media content segments may be distributed on the channel to be viewed on the plurality of user-computing devices 112a, . . . , 112n, based on a demand by the broadcast provider or users. The media content segments storage 128 may be communicatively coupled to the network 110. The media content segments storage 128 may include pre-encoded media assets.

The metadata storage 130 may comprise suitable logic, circuitry, and interfaces that may be configured to store metadata of the programming and/or non-programming content. For example, the metadata storage 130 may store the metadata that include rules related to the programming content and/or non-programming content. For example, the metadata may specify whether or not the programming content and/or non-programming content may be archived, and if so when and where can it be archived. The metadata may also specify whether or not the programming content and/or non-programming content may be blocked out, and if so where and what portions may be blocked out. The metadata may further include the one or more inbound triggers of the programming content and/or the non-programming content. The metadata may further include one or more attributes of the programming content and/or the non-programming content, such as start time and end time of one or more portions of the programming content and/or the non-programming content.

In accordance with an embodiment, the metadata storage 130 may include metadata associated with live content segments of one or more live feeds of channels stored in the live content storage system 126. The metadata storage 130 may include metadata associated with media content segments stored in the media content storage system 128. Other examples of the metadata may include a media item identifier, a title of the media item, a short summary of the content segments, a file format, encryption information, length of the media item, a date and/or time the media item was added to the catalog of media items, a new item indicator for the media item, a media item class, for example, a television show, a cartoon program, a movie, a news media, an episode, a game, a clip, a recorded sports event, interactive media, and/or the like. In accordance with an embodiment, the metadata may also store program-specific information (PSI) data as defined by ISO/IEC13818-1 (MPEG-2), closed captioning data, and one or more inbound triggers of the live media feed associated with the live content segments stored in the live content segments storage 126. The functions and/or operations performed by the media content packaging and distribution system 102, and its various components, are further described, in FIGS. 2, 3, 4, 5, and 6.

Figure 2:
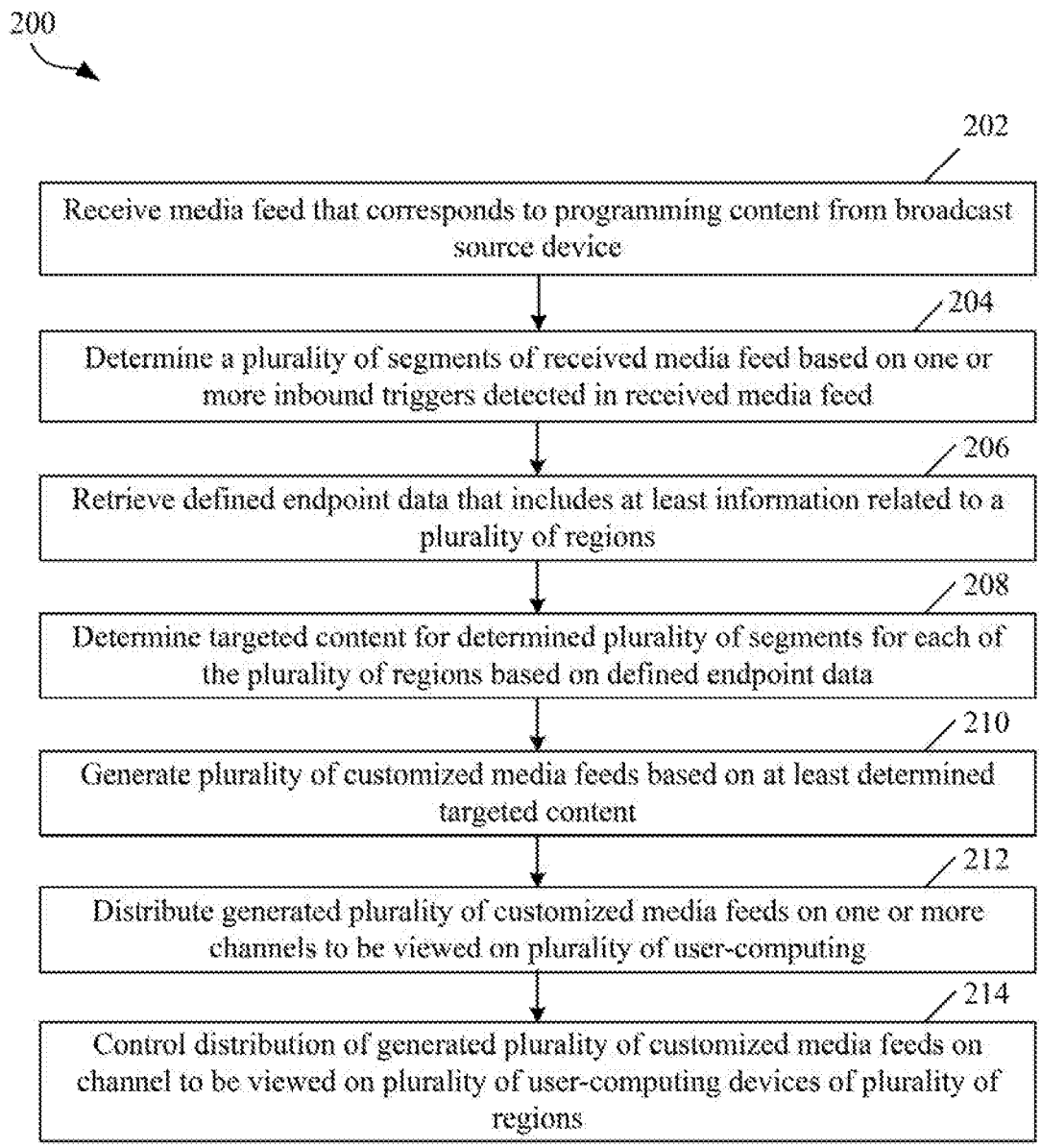
FIG. 2 depicts a flow chart illustrating high-level operation of the media content packaging and distribution system of FIG. 1B, in accordance with an exemplary embodiment of the disclosure.

FIG. 2 is a flow chart illustrating high-level operation of the media content packaging and distribution system of FIG. 1B, in accordance with an exemplary embodiment of the disclosure. Referring to FIG. 2, there is shown a flow chart 200 comprising exemplary operations 202 through 214. At 202, the content packager 120 may receive a media feed from the distribution source device 119 of a broadcast provider, over a communication network, such as the network 110. The media feed may correspond to programming content. The received media feed may correspond to a real-time media feed (for example, a live video feed and/or a live audio feed) and/or a non-real time media feed (for example, a broadcast feed). The received media feed may comprise information that indicates one or more inbound triggers. Further, the received media feed may be associated with an input format, for example, MPEG2 TS or other suitable formats. The content packager 120 may be configured to convert the input format of the received media feed into a plurality of output formats, for example, HLS, protected HLS, Smooth Streams, and dynamic adaptive streaming over HTTP (Dash), based on target devices, such as the plurality of user-computing devices 112a, . . . , 112n of a plurality of regions.

At 204, a plurality of segments of the received media feed may be determined. The content packager 120 may be configured to determine the plurality of segments of the received media feed based on the one or more inbound triggers detected in the received media feed. Based on the determined plurality of segments of the received media feed, one or more spots may be determined, where non-programming content may be stitched.

At 206, defined endpoint data that includes at least information related to a plurality of regions may be retrieved from the data collection systems 106a, . . . , 106n. The TCD system 124 may be configured to retrieve the defined endpoint data from the data collection systems 106a, . . . , 106n. The data collection systems 106a, . . . , 106n of the plurality of regions may be configured to collect (or extract) the defined endpoint data from the plurality of data sources associated with the plurality of regions. The plurality of data sources may correspond to, but is not limited to, one or more social networking platforms (e.g., Twitter or Facebook) and one or more sensing devices (e.g., temperature sensors, barometer, and/or the like). The defined endpoint data may further include at least one of demographic data, zonal data, media-viewing pattern data, and station IDs, such as IDs of local stations of an affiliate.

At 208, targeted content for the determined plurality of segments of the received media feed for each of the plurality of regions may be determined. The TCD system 124 may be configured to determine the targeted content for each of the plurality of regions based on the respective defined endpoint data. The targeted content to be stitched in the one or more spots of the plurality of segments of the received media feed may be further determined based on a real-time or near real-time events-driven feedback received from a hardware social feedback system, such as one or more of the data collection system 106a, ... 106n. The determined targeted content may correspond to multimedia content, for example, at least one of video content, audio content, text content, or animated content. Further, the determined targeted content for a region of the plurality of regions may be representative of at least region-specific information, for example, weather condition, traffic condition, pollution level, and/or the like, of the particular region. The determined targeted content for the region may be further representative of region-specific advertisements, offers, discounts, promos, events, and/or the like, of the region. Further, the determined targeted content of the region of the plurality of regions may be different from the determined targeted content of remaining regions of the plurality of regions.

At 210, a plurality of customized media feeds may be generated based on at least the determined targeted content. The generated plurality of customized media feeds may represent a plurality of versions of a channel, where each version corresponds to one of the plurality of regions. The SM 122 may be configured to execute media (e.g. audio and/or video) stitching of the plurality of segments of the received media feed and the determined targeted content for the plurality of regions to generate the plurality of customized media feeds. For example, the media (e.g. audio and/or video) stitching may include a replacement of a segment of the plurality of segments with the determined targeted content. In another example, the media (e.g. audio and/or video) stitching may include an insertion or addition of the determined targeted content among the plurality of segments. In yet another example, the media (e.g. audio and/or video) stitching may further include a re-ordering of the plurality of segments along with the insertion of the determined targeted content (or replacement of a segment with the determined targeted content). The media (e.g. audio and/or video) stitching of the plurality of segments of the received media feed and the determined targeted content for the plurality of regions may be executed based on at least one or more modifications of a programming schedule of the channel executed by the scheduler 118. The one or more modifications of the programming schedule of the channel may be determined based on at least a length of the received media feed, the one or more inbound triggers of the received media feed, a length of the determined targeted content, and/or the plurality of regions. The scheduler 118 may be configured to generate the programming schedule of the channel. The programming schedule of the channel for a defined time period may be generated based on programming content and non-programming content that are to be distributed (e.g. aired, multicast, broadcast, simulcast, streamed) on the channel during the defined time period. Further, the programming schedule of the channel for the defined time period may be determined based on the length of each of the programming content and the length of each of the non-programming content that are to be distributed on the channel during the defined time period.

At 212, the generated plurality of customized media feeds may be distributed on one or more channels to be viewed on the plurality of user-computing devices 112a, ..., 112n. The packaging and distribution system 114 may be configured to distribute (e.g. aired, multicast, broadcast, simulcast, streamed) the generated plurality of customized media feeds on the channel to be viewed on the plurality of user-computing devices 112a, ..., 112n, via one or more communication mediums, or a distribution system, for example, the network 110. In accordance with an embodiment, a generated customized media feed of the generated plurality of customized media feeds to be viewed on a set of user-computing devices of the plurality of user-computing devices 112a, ..., 112n may correspond to a region of the plurality of regions. In such scenario, a set of users of the set (plurality) of user-computing devices associated with the region may view streaming of the generated customized media feed that corresponds to the region on the set of user-computing devices. Further, the distribution of the generated customized media feed of the channel to be viewed on the set of user-computing devices of the region may be executed. The distribution may be executed such that the generated customized media feed is different from remaining generated customized media feeds of the generated plurality of customized media feeds. The remaining generated customized media feeds of the generated plurality of customized media feeds may be viewed on remaining user-computing devices of the plurality of user-computing devices 112a, ..., 112n located at remaining regions of the plurality of regions.

At 214, the distribution of the generated plurality of customized media feeds on the channel to be viewed on the plurality of user-computing devices 112a, ..., 112n may be controlled. The packaging and distribution system 114 may be configured to control distribution of the generated plurality of customized media feeds on the channel to be viewed on the plurality of user-computing devices 112a, ..., 112n at the plurality of regions. In accordance with an embodiment, the distribution of the generated plurality of customized media feeds may be controlled based on a streaming criterion of the generated plurality of customized media feeds to be viewed on the user-computing devices 112a, ..., 112n at the plurality of regions. The streaming criterion may be determined based on a streaming status of the generated plurality of customized media feeds in the plurality of regions. The packaging and distribution system 114 may monitor the streaming status of the generated plurality of customized media feeds on the plurality of user-computing devices 112a, ..., 112n at each the plurality of regions. Based on the determined streaming status, the packaging and distribution system 114 may determine either to continue or terminate distribution of the generated plurality of customized media feeds on the plurality of user-computing devices 112a, ..., 112n at the plurality of regions. For example, if a customized media feed generated for a region is not being streamed on a single user-computing device of the region, the packaging and distribution system 114 may terminate distribution of the generated customized media feed for the region. Consequently, the SM 122 may further terminate the generation of the customized media feed for the region. Such controlled distribution of the generated plurality of customized media feeds may minimize power and bandwidth of the one or more communication mediums, such as the network 110, that are required for distribution. Such distribution of the generated plurality of customized media feeds may enable different users of different regions to view same programming content (e.g., the received media feed, such as a television show) but different non-programming content (e.g., the determined targeted content, such as weather conditions) on the same channel, for example, a national television channel, such as CNN. Thus, it may not be required to create different channels for the different users of the different regions, thereby, minimizing at least operational cost, additional infrastructure cost, and maintenance cost that may be required for creating the different channels.

Currently, dedicated encoders, such as physical encoders, are used to encode each program stream before transmission (i.e. before a distribution of a program stream of a channel). Such dedicated encoders are not only costly but also limit ability of a distribution system provider such as a broadcast provider to swap or change content dynamically in a program stream as each content item needs to pass through such dedicated encoders for transmission. In other words, if any new content item is to be inserted in the program stream of channel that is to be distributed, that program stream then needs to be re-encoded again. This in turn increases re-work and requires installation of large infrastructures and resources to maintain uninterrupted content delivery for existing channel and limits the ability of the broadcast or network provider to change content in real time or near-real time. In accordance with the various embodiments of the present disclosure, the media content packaging and distribution system 102 provides an ability to dynamically schedule a media item, such as the determined targeted content, which is pre-encoded, and insert the media item in an existing live media feed of a channel to be directly delivered over the network 110 to be viewed on one or more user-computing devices 112a, . . . , 112n. The program stream in which the new media item, such as the determined targeted content, is inserted may not be required to pass through the dedicated encoders before delivery over the network 110, such as the CDN.

Figure 3:
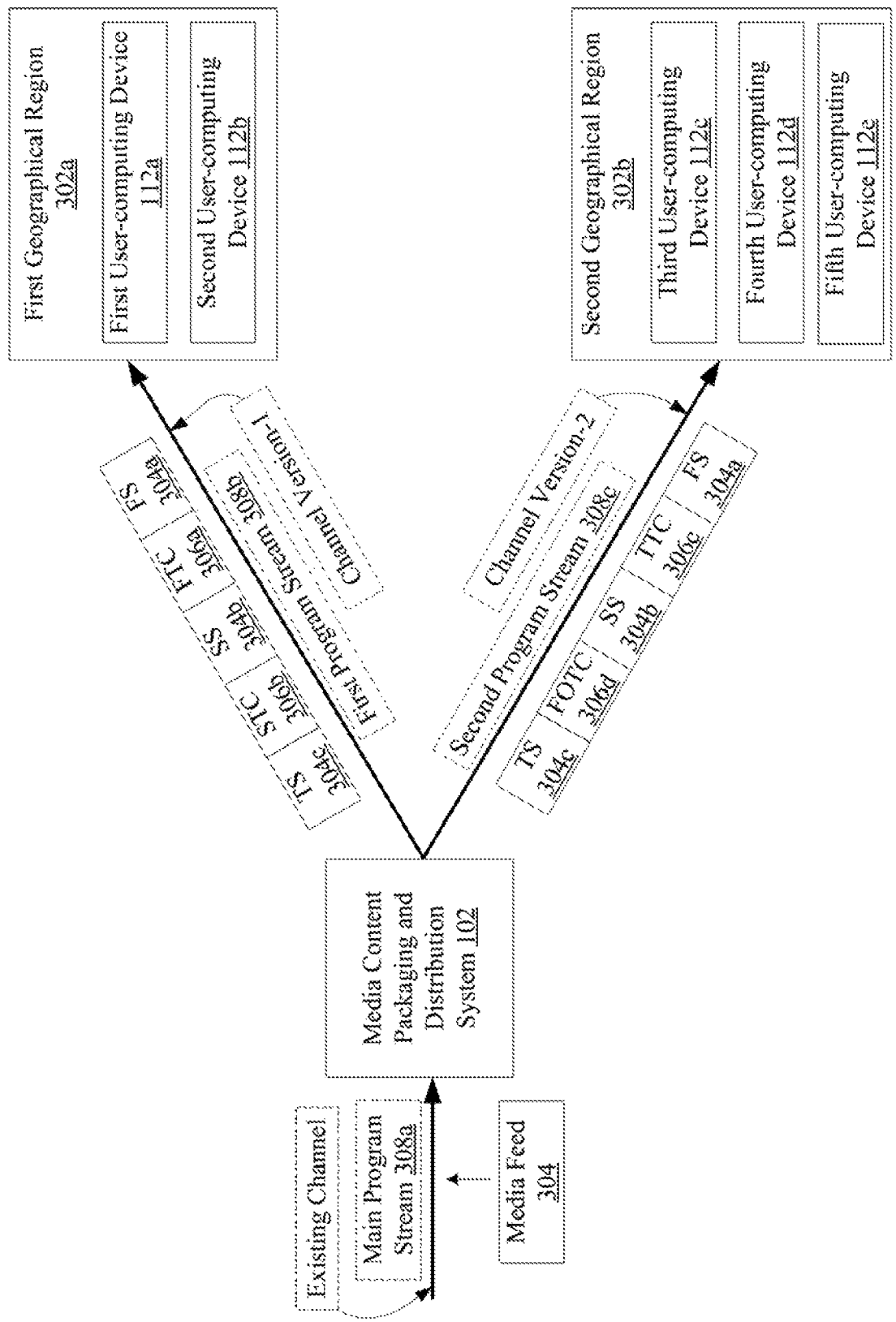
FIG. 3 is a block diagram that illustrates an exemplary scenario for dynamic channel versioning in a broadcast air chain, in accordance with an exemplary embodiment of the disclosure.

FIG. 3 is a block diagram that illustrates an exemplary scenario for dynamic channel versioning in a broadcast air chain, in accordance with an exemplary embodiment of the disclosure. Referring to FIG. 3, there is shown the media content packaging and distribution system 102, as described in FIG. 1A. There is further shown a first region 302a and a second region 302b. The first region 302a may include a first user-computing device 112a and a second user-computing device 112b. The second region 302b may include a third user-computing device 112c, a fourth user-computing device 112d, and a fifth user-computing device 112e, as shown. There is further shown a media feed 304 that is required to be distributed on a channel (e.g., a television channel, such as CNN) to be viewed by users of the first region 302a and the second region 302b. The media feed 304 may correspond to a main program stream 308a, such as an existing channel.

There is further shown a first program stream 308b, such as a different version "channel version 1" of the existing channel, and a second program stream 308c, such as another version "channel version 2" of the existing channel. For the sake of brevity, the operations of channel versioning are shown by taking an example of the media feed 304 that is divided into three segments, for example, a first segment (FS) 304a, a second segment (SS) 304b, and a third segment (TS) 304c, by the content packager 120 (as described in FIG. 1B) of the media content packaging and distribution system 102. However, it is to be understood that there may be multiple media segments of programming and non-programming content in the received media feed 304. There is further shown targeted content, such as a first targeted content (FTC) 306a, a second targeted content (STC) 306b, a third targeted content (TTC) 306c, and a fourth targeted content (FOTC) 306d.

The FTC 306a and the STC 306b are determined by the TCD system 124 for the first region 302a. The TTC 306c and the FOTC 306d are determined by the TCD system 124 for the second region 302b. The TCD system 124 may determine the targeted content based on the defined endpoint data associated with the first region 302a and the second region 302b. For example, the FTC 306a and the TTC 306c may be generated (for example, having same run length) based on weather condition of the first region 302a and the second region 302b, respectively. The STC 306b and the FOTC 306d may be determined (for example, having same run length) based on historical monuments of the first region 302a and traffic conditions of the second region 302b, respectively.

The SM 122 may be configured to execute media stitching of the segments of the media feed 304 and the determined targeted content of the first region 302a to generate a customized media feed for the first region 302a. For example, the FS 304a, the FTC 306a, the SS 304b, the STC 306b, and the TS 304c may be stitched together, as shown, based on a programming schedule to generate the customized media feed to be viewed on the first user-computing device 112a and the second user-computing device 112b associated with the first region 302a. The generated customized media feed of the first region 302a may correspond to the first program stream 308b, such as the "channel version 1" of the existing channel, which is distributed on the channel to be viewed on the first user-computing device 112a and the second user-computing device 112b. Similarly, the SM 122 may be configured to execute media stitching of the segments of the media feed 304 and the generated targeted content of the second region 302b to generate the customized media feed for the second region 302b. For example, the FS 304a, the TTC 306c, the SS 304b, the FOTC 306d, and the TS 304c may be stitched together, as shown, based on another programming schedule to generate the customized media feed to be viewed on the third user-computing device 112c, the fourth user-computing device 112d, and the fifth user-computing device 112e associated with the second region 302b.

The generated customized media feed of the second region 302b may correspond to the second program stream 308c, such as the "channel version 2" of the existing channel, which is distributed to be viewed on the third user-computing device 112c, the fourth user-computing device 112d, and the fifth user-computing device 112e. Based on such distribution of the generated customized media feeds, the users of the user-computing devices at the first region 302a and the second region 302b may view the same programming content (such as TV shows, for example, the FS 304a, the SS 304b, and the TS 304c) with different non-programming or targeted content (for example, the FTC 306a and the STC 306b for the first region 302a and the TTC 306c and the FOTC 306d for the second region 302b ) that are aired. Thus, dynamic versioning of the existing channel may be provided in real time or near-real time without the requirement to re-encode the different versions before transmission for the different regions.

Figure 4:
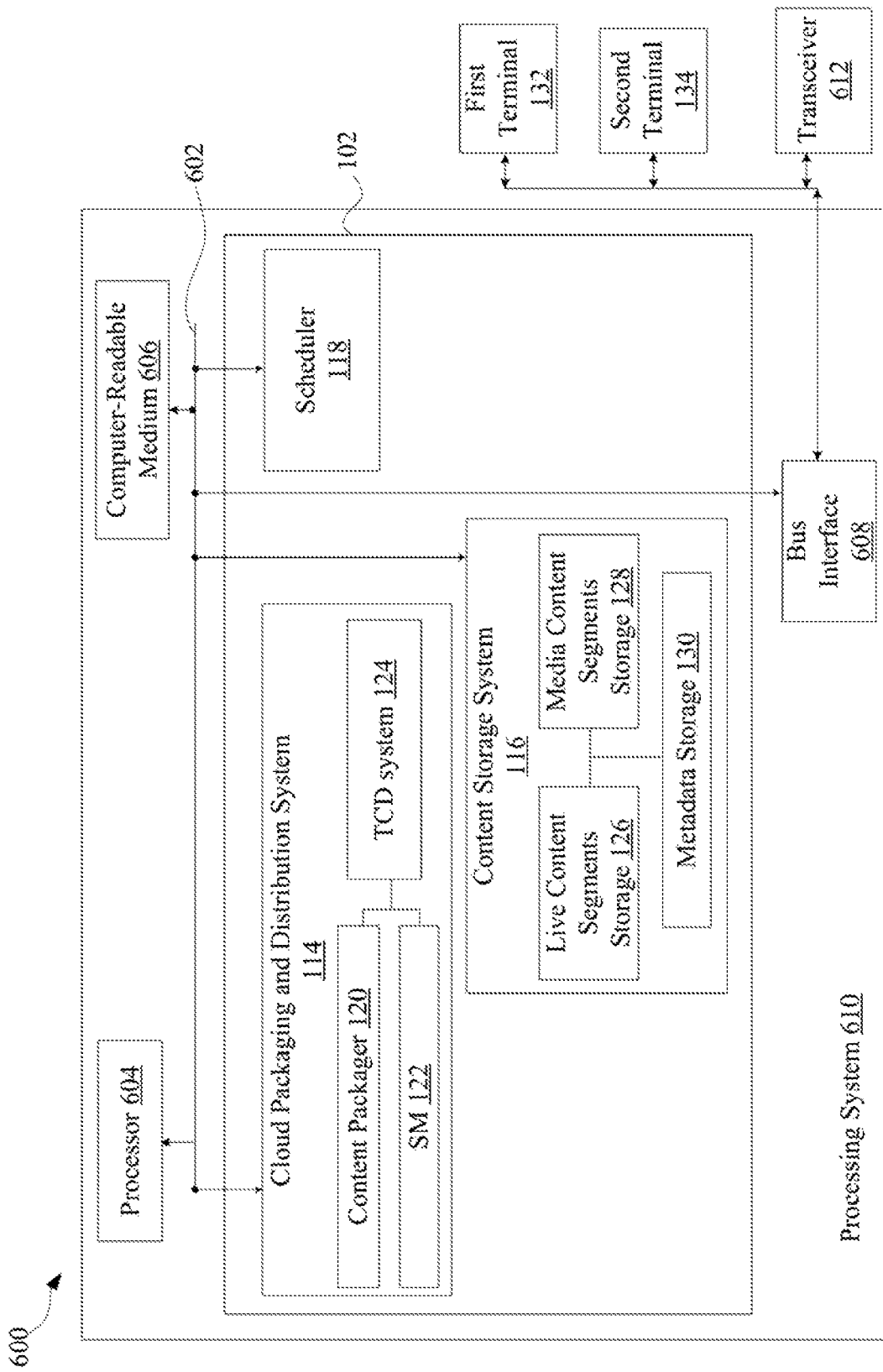
FIG. 4 is a conceptual diagram that illustrates an example of a hardware implementation for a media content packaging and distribution system employing a processing system for generating dynamic channel versioning in a broadcast air chain, in accordance with an exemplary embodiment of the disclosure.

FIG. 4 is a conceptual diagram illustrating an example of a hardware implementation for a media content packaging and distribution system employing a processing system for generating dynamic channel versioning in a broadcast air chain, in accordance with an exemplary embodiment of the disclosure. Referring to FIG. 4, the hardware implementation shown by a representation 600 for the media content packaging and distribution system 102 employs a processing system 610 for generating dynamic channel versioning in a broadcast air chain, in accordance with an exemplary embodiment of the disclosure, as described herein. In some examples, the processing system 610 may comprise one or more hardware processors, such as the processor 604, a non-transitory computer-readable medium 606, a hardware packaging and distribution system 114, a hardware content storage system 116, and a hardware scheduler 118. The hardware packaging and distribution system 114 may comprise a hardware content packager 120, a hardware SM 122, and a hardware TCD system 124. The hardware content storage system 116 may comprise a hardware live content segments storage 126, a hardware media content segments storage 128, and a hardware metadata storage 130.

In this example, the media content packaging and distribution system 102 employing the processing system 610 may be implemented with bus architecture, represented generally by bus 602. The bus 602 may include any number of interconnecting buses and bridges depending on the specific implementation of the media content packaging and distribution system 102 and the overall design constraints. The bus 602 links together various circuits including the one or more processors, represented generally by the processor 604, the non-transitory computer-readable media, represented generally by the computer-readable medium 606, the hardware packaging and distribution system 114, the hardware scheduler 118, the hardware content packager 120, the hardware SM 122, and the hardware TCD system 124 which may be configured to perform one or more operations or methods described herein. A bus interface 608 provides an interface between the bus 602 and a transceiver 612. The transceiver 612 provides a means for communicating via the network 110 with various other apparatus, such as the published data sources 104a, . . . , 104n, the data collection systems 106a, . . . , 106n, the advertiser order generation systems 108a, . . . , 108n, and the plurality of user-computing devices 112a, . . . , 112n.

User terminals, such as the first terminal 132 and the second terminal 134 may comprise a keypad, display, speaker, microphone, pointing to enable a user, such as a broadcast or network provider, a marketing user, and a sales user to interact with the media content packaging and distribution system 102. The first terminal 132 may be configured to present a user interface that enables the user, such as the broadcast or network provider, to configure and interact with components, such as the content storage system 116 and the scheduler 118. Similarly, the second terminal 134 may be configured to present another user interface that enables the user, such as the marketing user or the sales user, to configure and interact with components, such as the data collection systems 106a, . . . , 106n.

The processor 604 may be configured to manage the bus 602 and general processing, including the execution of a set of instructions stored on the computer-readable medium 606. The set of instructions, when executed by the processor 604, causes the media content packaging and distribution system 102 to execute the various functions described herein for any particular apparatus. The computer-readable medium 606 may also be used for storing data that is manipulated by the processor 604 when executing the set of instructions. The computer-readable medium 606 may also be configured to store data for one or more of the hardware packaging and distribution system 114, the hardware scheduler 118, the hardware content packager 120, the hardware SM 122, and/or the hardware TCD system 124.

In an aspect of the disclosure, the processor 604, the computer-readable medium 606, or a combination of both may be configured or otherwise specially programmed to execute the operations or functionality of the hardware packaging and distribution system 114, the hardware scheduler 118, the hardware content packager 120, the hardware SM 122, the hardware TCD system 124, or various other components described herein. For example, the processor 604, the computer-readable medium 606, or a combination of both may be configured or otherwise specially programmed to perform the operations and functionality of the hardware packaging and distribution system 114, the hardware scheduler 118, the hardware content packager 120, the hardware SM 122, and the hardware TCD system 124, as described with respect to FIGS. 1A, 1B, 2, 3, and 4.

Various embodiments of the disclosure comprise a media content packaging and distribution system 102 that may be configured to handle dynamic channel versioning in a broadcast air chain. The media content packaging and distribution system 102 may comprise, for example, the packaging and distribution system 114, the content storage system 116, and the scheduler 118. The packaging and distribution system 114 may comprise the content packager 120, the SM 122, and the TCD system 124. The content storage system 116 may comprise the live content segments storage 126, the media content segments storage 128, and the metadata storage 130. The content packager 120 may be configured to receive a media feed that corresponds to programming content from the distribution source device 119 of a broadcast provider. The content packager 120 may further determine a plurality of segments of the received media feed based on one or more inbound triggers detected in the received media feed. The data collection systems 106a, . . . , 106n may be configured to collect (or extract) endpoint data defined by the broadcast provider (or advertisers) from the plurality of data sources associated with a plurality of regions. The plurality of data sources may correspond to at least one or more social networking platforms (e.g., Twitter or Facebook) and one or more sensing or measuring devices (e.g., temperature sensors, anemometers, barometer, hygrometer, and/or the like). Aggregated endpoint data may be generated from the collected and/or extracted endpoint data.

The scheduler 118 and the packaging and distribution system 114 provides significant productivity and efficiency improvements since the process of creating hundreds of new channel versions from an existing channel has been simplified and a real time or near-real time (dynamic) scheduling of determined targeted content is enabled. The scheduler 118 and packaging and distribution system 114 provides an ability to the media content packaging and distribution system 102 to insert a determined targeted content item, in an existing live media feed of a channel in real time or near-real time to be directly delivered over the network 108 to be viewed on one or more user-computing devices 112a, . . . , 112n. The program streams in which the newly determined targeted content item is inserted may not be required to pass through the dedicated and costly physical encoders before delivery over the network 110, such as the CDN. Thus, the scheduler 118 enables the media content packaging and distribution system 102 to operate more efficiently and optimally providing both an economic and a cost advantage. A plurality of new channels versions may be created utilizing less memory than would otherwise be required resulting in much faster processing time (faster computation time without sacrificing accuracy). This enables a faster or real time change of programming schedule and scheduling of selected determined targeted content, such as a local weather media item, based on the endpoint data, such as geographical, zonal, or regional data, or ZIP code. The ability to quickly generate new channel versions may free-up valuable processing resources such as memory and computing power. The scheduler 118 in association with the packaging and distribution system 114 provides the network provider with an ability to leverage a single master source but splice in unique content and ads for different demographics or zones in cost-effective manner, which in turn provides enhanced viewer experience and increases appeal of the channel versions for end users and enables the broadcast provider to gain wider audience. Further, when an un-utilized customized media feed is detected in a region, the packaging and distribution system 114 may terminate the distribution of the generated customized media feed for the region. Based on at least the terminated distribution, the SM 122 may further terminate the generation of the customized media feed for the region. Such controlled distribution of the generated plurality of customized media feeds may minimize power and bandwidth of the one or more communication mediums that are required for the distribution.

Various embodiments of the disclosure may provide a non-transitory computer-readable medium having stored thereon, computer implemented instruction that when executed by a processor causes a media content packaging and distribution system to execute operations to control creation and distribution of a channel to be viewed on one or more a plurality of user-computing devices associated with a plurality of regions. The media content packaging and distribution system 102 may execute operations comprising receiving a media feed of the channel from the distribution source device 119 over a communication network, such as the network 110. Targeted content for a plurality of segments of the received media feed for each of the plurality of regions may be determined, based on defined endpoint data that includes at least information related to the plurality of regions. A plurality of customized media feeds may be generated based on at least the determined targeted content, wherein the generated plurality of customized media feeds represents a plurality of versions of the channel. The plurality of customized media feeds to be viewed on the plurality of user-computing devices may be distributed via one or more communication mediums. A customized media feed of the plurality of customized media feeds to be viewed on a set of user-computing devices of the plurality of user-computing devices corresponds to a region of the plurality of region.

The word "exemplary" is used herein to mean "serving as an example, instance, or illustration." Any embodiment described herein as "exemplary" is not necessarily to be construed as preferred or advantageous over other embodiments. Likewise, the term "embodiments of the disclosure" does not require that all embodiments of the disclosure include the discussed feature, advantage, or mode of operation.

As utilized herein the terms "circuits" and "circuitry" refer to physical electronic components (i.e. hardware) and any software and/or firmware ("code") which may configure the hardware, be executed by the hardware, and/or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequences of actions described herein can be considered to be embodied entirely within any non-transitory form of computer readable storage medium having stored therein a corresponding set of computer instructions that upon execution would cause an associated processor to perform the functionality described herein. Thus, the various aspects of the disclosure may be embodied in several different forms, all of which have been contemplated to be within the scope of the claimed subject matter. In addition, for each of the embodiments described herein, the corresponding form of any such embodiments may be described herein as, for example, "logic configured to" perform the described action.

Another embodiment of the disclosure may provide a non-transitory machine and/or computer readable storage and/or media, having stored thereon, a machine code and/or a computer program having at least one code section executable by a machine and/or a computer, thereby causing the machine and/or computer to perform the steps as described herein for dynamic channel versioning in a broadcast air chain.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Further, those of skill in the art will appreciate that the various illustrative logical blocks, modules, circuits, algorithm, and/or steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the embodiments disclosed herein may be embodied directly in firmware, hardware, in a software module executed by a processor, or in a combination thereof. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

While the present disclosure has been described with reference to certain embodiments, it will be noted understood by, for example, those skilled in the art that various changes and modification could be made and equivalents may be substituted without departing from the scope of the present disclosure as defined, for example, in the appended claims. In addition, many modifications may be made to adapt a particular situation or material to the teachings of the present disclosure without departing from its scope. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated. Therefore, it is intended that the present disclosure not be limited to the particular embodiment disclosed, but that the present disclosure will include all embodiments falling within the scope of the appended claims.

What is claimed is:

1. A system, comprising:
   one or more circuits in a media content packaging and distribution system that controls creation and distribution of a channel, the channel comprising media to be viewed on at least one user-computing device of a plurality of user-computing devices associated with at least one region of a plurality of regions, the one or more circuits configured to:
   receive a media feed of the channel from a distribution source device over the media content packaging and distribution system,
      wherein the media feed of the channel corresponds to a live feed of an event;
   extract first endpoint data from a first data source associated with the plurality of regions and second endpoint data from a second data source associated with the plurality of regions, wherein the first data source is different from the second data source;
   determine a sum of the first endpoint data extracted from the first data source and the second endpoint data extracted from the second data source;
   determine targeted content for a plurality of segments of the received media feed for each region of the plurality of regions, based on the sum of the first endpoint data extracted from the first data source and the second endpoint data extracted from the second data source;
   generate a plurality of customized media feeds based on at least the determined targeted content, wherein the generated plurality of customized media feeds represents a plurality of versions of the channel; and
   distribute the plurality of customized media feeds to the at least one user-computing device of the plurality of user-computing devices via at least one communication medium,
      wherein a customized media feed of the plurality of customized media feeds to be viewed on a set of user-computing devices of the plurality of user-computing devices corresponds to a given region of the plurality of regions, and
      wherein the customized media feed is distributed to the at least one user-computing device based on the customized media feed that is streamed on at least a single user-computing device of the set of user-computing devices at the given region of the plurality of regions.

2. The system according to claim 1, wherein the media feed further corresponds to a stored media feed.

3. The system according to claim 1, wherein at least one of the first endpoint data or the second endpoint data further comprises demographic data.

4. The system according to claim 1, wherein the one or more circuits are further configured to determine the plurality of segments of the received media feed based on an out of band trigger detected in the received media feed.

5. The system according to claim 1, wherein the generation of the plurality of customized media feeds for the at least one region of the plurality of regions is based on media stitching of the plurality of segments of the received media feed that corresponds to programming data and the determined targeted content for the at least one region of the plurality of regions.

6. The system according to claim 5, wherein the media stitching of the plurality of segments of the received media feed and the determined targeted content for the at least one region of the plurality of regions is based on modification of a programming schedule of the channel.

7. The system according to claim 5, wherein the media stitching comprises a replacement of a segment of the plurality of segments with the determined targeted content.

8. The system according to claim 1, wherein the distribution of the customized media feed of the plurality of customized media feeds to the at least one user-computing device of the plurality of user-computing devices of the at least one region of the plurality of regions is executed such that the customized media feed is different from remaining customized media feeds of the plurality of customized media feeds that are to be viewed on at least one remaining user-computing device of the plurality of user-computing devices located at remaining regions of the plurality of regions.

9. The system according to claim 1, wherein the one or more circuits are further configured to control the distribution of the plurality of customized media feeds to the plurality of user-computing devices at the plurality of regions,
   wherein the distribution of the plurality of customized media feeds is controlled based on a streaming criteria of the plurality of customized media feeds on the plurality of user-computing devices at the plurality of regions,
   wherein the streaming criteria is based on a streaming status of the plurality of regions, and
   wherein the control of the distribution of the plurality of customized media feeds minimizes power and bandwidth of the at least one communication medium required for the distribution.

10. The system according to claim 1, wherein the targeted content for insertion in at least one spot in the plurality of segments of the received media feed is further determined based on at least one of near real-time feedback, or historical events-driven feedback received.

11. The system according to claim 1, wherein the one or more circuits are further configured to store metadata that comprises rules associated with one of archive or block at least one media feed of the channel.

12. The system according to claim 1, wherein at least one of the first endpoint data or the second endpoint data is based on instructions defined by a network provider.

13. The system according to claim 1, wherein at least one of the first endpoint data or the second endpoint data is based on an aggregate of first data associated with at least one social networking platform and second data associated with at least one sensing device.

14. A method, comprising:
in a media content packaging and distribution system that controls creation and distribution of a channel, the channel comprising media to be viewed on at least one user-computing device of a plurality of user-computing devices associated with at least one region of a plurality of regions:
receiving a media feed of the channel from a distribution source device over the media content packaging and distribution system,
wherein the media feed of the channel corresponds to a live feed of an event;
extracting first endpoint data from a first data source associated with the plurality of regions and second endpoint data from a second data source associated with the plurality of regions, wherein the first data source is different from the second data source;
determining a sum of the first endpoint data extracted from the first data source and the second endpoint data extracted from the second data source;
determining targeted content for a plurality of segments of the received media feed for each region of the plurality of regions, based on the sum of the first endpoint data extracted from the first data source and the second endpoint data extracted from the second data source;
generating a plurality of customized media feeds based on at least the determined targeted content, wherein the generated plurality of customized media feeds represents a plurality of versions of the channel; and
distributing the plurality of customized media feeds to the at least one user-computing device of the plurality of user-computing devices via at least one communication medium,
wherein a customized media feed of the plurality of customized media feeds to be viewed on a set of user-computing devices of the plurality of user-computing devices corresponds to a given region of the plurality of regions, and
wherein the customized media feed is distributed to the at least one user-computing device based on the customized media feed that is streamed on at least a single user-computing device of the set of user-computing devices at the given region of the plurality of regions.

15. The method according to claim 14, wherein the media feed further corresponds to a stored media feed.

16. The method according to claim 14, wherein at least one of the first endpoint data or the second endpoint data further comprises demographic data.

17. The method according to claim 14, further comprising determining the plurality of segments of the received media feed based on an out of band trigger detected in the received media feed.

18. The method according to claim 17, wherein the generation of the plurality of customized media feeds for the at least one region of the plurality of regions is based on media stitching of the plurality of segments of the received media feed that corresponds to programming data and the determined targeted content for the at least one region of the plurality of regions.

19. The method according to claim 18, wherein the media stitching of the plurality of segments of the received media feed and the determined targeted content for the at least one region of the plurality of regions is based on modification of a programming schedule of the channel.

20. The method according to claim 14, wherein the distribution of the customized media feed of the plurality of customized media feeds the at least one user-computing device of the plurality of user-computing devices of the at least one region of the plurality of regions is executed such that the customized media feed is different from remaining customized media feeds of the plurality of customized media feeds, wherein the remaining customized feeds are to be viewed on at least one remaining user-computing device of the plurality of user-computing devices located at remaining regions of the plurality of regions.

21. The method according to claim 14, wherein the distribution of the plurality of customized media feeds to be viewed on the plurality of user-computing devices at the plurality of regions is controlled,
wherein the distribution of the plurality of customized media feeds is controlled based on a streaming criteria of the plurality of customized media feeds on the plurality of user-computing devices at the plurality of regions, wherein the streaming criteria is based on a streaming status of the plurality of customized media feeds in the plurality of regions, and wherein the control of the distribution of the plurality of customized media feeds minimizes power and bandwidth of the at least one communication medium required for the distribution.

22. The method according to claim 14, wherein the targeted content for insertion in at least one spot in the plurality of segments of the received media feed is further determined based on at least one of near real-time feedback, or historical events-driven feedback received.

23. The method according to claim 14, wherein the distribution of the plurality of customized media feeds to the plurality of user-computing devices at the plurality of regions is controlled to enable different regions of the plurality of regions to view same programming content but different non-programming content on a same channel.

24. A non-transitory computer-readable medium having stored thereon, computer-executable instructions which when executed by a computer, cause the computer to execute operations, the operations comprising:
in a media content packaging and distribution system that controls creation and distribution of a channel, the channel comprising media to be viewed on at least one user-computing device of a plurality of user-computing devices associated with at least one region of a plurality of regions:
receiving a media feed of the channel from a distribution source device over the media content packaging and distribution system, wherein the media feed of the channel corresponds to a live feed of an event;

extracting first endpoint data from a first data source associated with the plurality of regions and second endpoint data from a second data source associated with the plurality of regions, wherein the first data source is different from the second data source;

determining a sum of the first endpoint data extracted from the first data source and the second endpoint data extracted from the second data source;

determining targeted content for a plurality of segments of the received media feed for each region of the plurality of regions, based on the sum of the first endpoint data extracted from the first data source and the second endpoint data extracted from the second data source;

generating a plurality of customized media feeds based on at least the determined targeted content, wherein the generated plurality of customized media feeds represents a plurality of versions of the channel; and distributing the plurality of customized media feeds to the at least one user-computing device of the plurality of user-computing devices via at least one communication medium, wherein a customized media feed of the plurality of customized media feeds to be viewed on a set of user-computing devices of the plurality of user-computing devices corresponds to a given region of the plurality of regions, and wherein the customized media feed is distributed to the at least one user-computing device based on the customized media feed that is streamed on at least a single user-computing device of the set of user-computing devices at the given region of the plurality of regions.

25. The non-transitory computer-readable medium according to claim 24, wherein the media feed further corresponds to a stored media feed.

* * * * *